US010057170B2

(12) United States Patent
Kumar et al.

(10) Patent No.: US 10,057,170 B2
(45) Date of Patent: Aug. 21, 2018

(54) INTELLIGENT DROPPING OF PACKETS IN A NETWORK VISIBILITY FABRIC

(71) Applicant: Gigamon Inc., Santa Clara, CA (US)

(72) Inventors: Anant Kumar, Santa Clara, CA (US); Bhanu Prathap Reddy Parlapalli, Danville, CA (US)

(73) Assignee: Gigamon Inc., Santa Clara, CA (US)

( * ) Notice: Subject to any disclaimer, the term of this patent is extended or adjusted under 35 U.S.C. 154(b) by 85 days.

(21) Appl. No.: 15/274,871

(22) Filed: Sep. 23, 2016

(65) Prior Publication Data

US 2018/0091427 A1 Mar. 29, 2018

(51) Int. Cl.

*H04L 12/807* (2013.01)
*H04L 12/26* (2006.01)
*H04L 12/851* (2013.01)
*H04L 12/801* (2013.01)

(52) U.S. Cl.

CPC .......... *H04L 47/11* (2013.01); *H04L 43/0882* (2013.01); *H04L 43/0894* (2013.01); *H04L 43/16* (2013.01); *H04L 47/24* (2013.01)

(58) Field of Classification Search

None

See application file for complete search history.

(56) References Cited

U.S. PATENT DOCUMENTS 7,088,678 B1 * 8/2006 Freed ...................... H04L 47/10 370/230
7,502,319 B2 * 3/2009 Youn ...................... H04L 47/10 370/230
8,000,253 B2 * 8/2011 Yasuie .................... H04L 43/50 370/242
9,769,074 B2 * 9/2017 DeCusatis ............... H04L 47/12
2003/0179705 A1 * 9/2003 Kojima ............... H04L 43/0876 370/230
2013/0215754 A1 * 8/2013 Tripathi ................ H04L 49/253 370/236

* cited by examiner

*Primary Examiner* — Hong Cho
(74) *Attorney, Agent, or Firm* — Perkins Coie LLP

(57) ABSTRACT

A network appliance deployed in a visibility fabric may intelligently drop certain low priority traffic to avoid indiscriminate dropping of data packets across all flow maps during periods of high congestion. More specifically, the network appliance may determine the data packets of a flow map should be dropped based on priority measures assigned on a per-flow map basis. Such a technique enables the network appliance to drop low priority traffic and forward high priority traffic downstream. Also introduced herein are techniques for metering traffic in order to gain better control over the traffic that is forwarded to an egress port of a network appliance. Because a network tool connected to the egress port can become easily overwhelmed, the network appliance may filter the traffic based on the priority of the flow maps to ensure that the network tool does not receive more traffic than can be handled.

22 Claims, 13 Drawing Sheets

INTELLIGENT DROPPING OF PACKETS IN A NETWORK VISIBILITY FABRIC

FIELD OF THE INVENTION

At least one embodiment of the present disclosure pertains to systems and techniques for routing network traffic, and more particularly, to techniques for intelligently routing network traffic to avoid indiscriminate dropping of data packets during periods of high congestion.

BACKGROUND

Traffic in a computer network can be analyzed to improve real-time decision making for network operations, security techniques, etc. The traffic may be acquired at numerous entry points by a variety of devices and/or applications (collectively referred to as "nodes" in the computer network) to provide extensive visibility of traffic flow and network security. Given the complexity and volume of traffic routed through many infrastructures, various kinds of network tools are often used to identify, analyze, and/or handle security threats to the computer network, bottlenecks in the computer network, etc. Examples of such network tools include an intrusion detection system (IDS) and an intrusion prevention system (IPS).

Network appliances and network tools can operate as in-band (i.e., "inline") devices or out-of-band devices. Out-of-band devices operate outside of the path of data traffic between an origination node and a destination node and receive copies of the data packets that make up the traffic, rather than the original data packets. Out-of-band devices are able to freely modify the copies of the data packets because the original data packets are allowed to traverse the computer network unimpeded. Inline devices, on the other hand, operate within the path of data traffic between an origination node and a destination node and receive and forward the original data packets.

Traffic contracts typically govern how data traffic traverses the computer network through one or more inline devices (e.g., network appliances and network tools). However, because inline devices reside within the path of data traffic, noncompliance with a traffic contract can degrade the functionality of the computer network as a whole. For example, an inline device that suffers from high congestion may drop data packets indiscriminately. Metering (also referred to as "policing") is the process for monitoring compliance with a traffic contract and, if necessary, taking steps to enforce the traffic contract. But effective metering of inline devices can be difficult, particularly when the amount of data traffic flowing through an inline device varies over time.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1A:
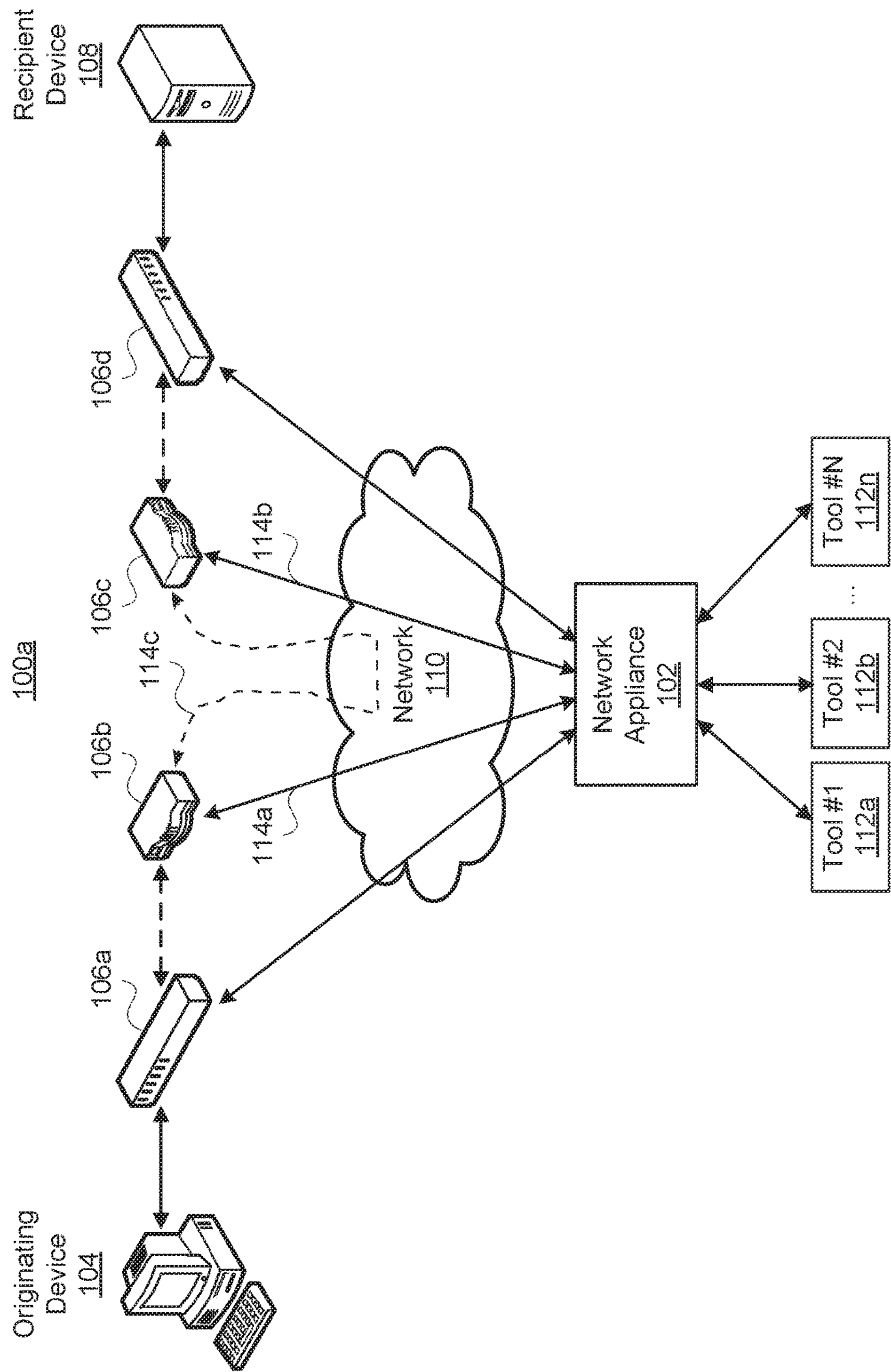
FIG. 1A depicts an example of a network arrangement in which a network appliance receives data packets from multiple devices and/or applications (collectively referred to as nodes) in a computer network.

In this description, references to "an embodiment," "one embodiment," and the like, mean that the particular feature, function, structure, or characteristic being described is included in at least one embodiment introduced here. Occurrences of such phrases in this specification do not necessarily all refer to the same embodiment, nor are the embodiments referred to herein necessarily mutually exclusive.

A network appliance may be a node in a computer network that can be configured to receive data packets from one or more other nodes within the computer network. Moreover, a network appliance can act as a visibility fabric or as part of a visibility fabric. Often, the network appliance is coupled to a network tool, such as an IDS or IPS configured to analyze the data packets (or copies of the data packets), monitor the traffic within the computer network, and/or attempt to block or stop the transmission of abnormal (e.g., malicious) data packets.

The network appliance may be operable as an inline device and/or an out-of-band device. Inline network appliances are configured to receive data packets from one or more other nodes within a computer network and reside within the path of data traffic. Consequently, any interruptions to an inline network appliance's ability to manage the network traffic (e.g., due to congestion of an ingress or egress port) affect the functionality and availability of a traffic path and can compromise the computer network as a whole.

Conventional network appliances used in network visibility fabrics have simply dropped excess data traffic during periods of high congestion where an egress port (e.g., a tool port) of the network appliance is receiving more data traffic than can be handled. If multiple streams of data traffic are being directed to a single egress port, data packets are generally dropped by each of the streams in a consistent manner. The loss created by the dropped excess data traffic can disrupt the functionality of the computer network as a whole. This issue is compounded when the multiple streams of data traffic do not have similar priorities (e.g., when one stream includes high priority traffic, while another stream includes low priority traffic).

Introduced here, therefore, are systems and techniques for intelligently dropping certain low priority network traffic in a network appliance to avoid indiscriminate dropping of data packets during periods of high congestion. By assigning a priority to different streams of network traffic, a network appliance can reduce the traffic degradation experienced when the computer network is experiencing high usage (e.g., when utilization of one or more ingress ports of the network appliance exceeds a capacity threshold of a tool port of the network appliance). More specifically, the network appliances described herein determine which data packets should be dropped based on priority measures assigned on a per-flow map basis by an administrator or by the network appliance itself. A flow map is a data structure that represents a detailed traffic distribution policy for how incoming data packets are to be handled by the network appliance. For example, a flow map can indicate that an incoming data packet is to be aggregated with another data packet, filtered, modified (e.g., stripped of a header or payload), or forwarded to one or more tool ports. Such a technique allows the network appliance to ensure that high priority network traffic continues to be forwarded downstream (e.g., to a network tool or another network appliance) and low priority network traffic is dropped during periods of high congestion.

Also introduced here are systems and techniques for metering network traffic received by a network appliance to gain better control over the network traffic that is forwarded to each egress port (e.g., tool port). Often, the egress ports are connected to network tools for analyzing the network traffic. However, these network tools can be very resource intensive and, therefore, may have limited packet processing capabilities. By programming traffic rate thresholds within the network appliance, an administrator can ensure that none of the network tools receive more network traffic than can be handled. The traffic rate thresholds (which collectively form a bandwidth profile for the network appliance) also allow excess network traffic (i.e., traffic that cannot be handled by a primary network tool) to be cascaded across one or more other network tools. These secondary network tool(s) are typically only utilized during periods of high network traffic volume when the primary network appliance is overwhelmed.

General System Overview

FIG. 1A depicts an example of a network arrangement 100*a* in which a network appliance 102 receives data packets from multiple devices and/or applications (collectively referred to as nodes) in a computer network 110. The nodes (e.g., switches 106*a*, 106*d* and routers 106*b*, 106*c*) couple an originating device 104 (e.g., a desktop computer system) to a recipient device 108 (e.g., a server) and allow data packets to be transmitted between the originating device 104 and the recipient device 108. Examples of nodes include switches, routers, and network taps.

Each node represents an entry point into the computer network 110. The entry points could be, and often are, from different points within the computer network 110. Generally, at least some of the nodes are operable to transmit data packets received as network traffic (or duplicate copies of the data packets) to a network appliance 102 for analysis. Thus, network traffic is directed to the network appliance 102 by a node that provides an entry point into the computer network 110.

Whether a node transmits the original data packets or copies of the data packets to a device downstream of the node (e.g., the network appliance 102) depends on whether the downstream device is an inline device or an out-of-band device. As noted above, inline devices receive the original data packets, while out-of-band devices receive copies of the original data packets. The network appliance 102 is often deployed as an inline device and, thus, receives the original data packets from whichever device is immediately upstream of the network appliance 102.

Here, for example, the network appliance 102 can receive original data packets from node 106*b* (e.g., via transmission path 114*a*) and pass at least some of the original data packets to node 106*c* (e.g., via transmission path 114*b*). Because node 106*b* is able to transmit network traffic downstream through the network appliance 102, node 106*b* need not be coupled directly to node 106*c* (i.e., transmission path 114*c* may not exist). Some or all of the nodes within the computer network can be configured in a similar fashion.

When the network appliance 102 is deployed as an inline device, data packets are received by the network appliance at a physical network port (also referred to as an “ingress port”). For example, data packets transmitted by node 106*b* via transmission path 114*a* are received by the network appliance 102 at a particular network port. The network appliance 102 may include multiple network ports coupled to different nodes in the computer network 110. The network appliance 102 can be, for example, a monitoring platform that includes a chasses and interchangeable blades offering various functionalities, such as enhanced packet distribution and masking/filtering capabilities.

The network appliance 102 can also include multiple physical tool ports (also referred to as “egress ports”) that are coupled to different network tools 112*a-n*. As further described below, each network tool 112*a-n* can be deployed as an inline device or an out-of-band device at any given point in time. As administrator of the network appliance 102 may be able to switch the deployment mode of one or more of the network tools 112*a-n*. That is, the administrator may be able to deploy an out-of-band network tool as an inline device and vice versa. When a network tool is deployed as an out-of-band device, the network appliance 102 creates a duplicate copy of at least some of the data packets received by the network appliance 102, and then passes the duplicate copies to a tool port for transmission downstream to the out-of-band network tool. When a network tool is deployed as an inline device, the network appliance passes at least some of the original data packets to a tool port for transmission downstream to the inline network tool, and those data packets are then normally received back from the tool at a separate tool port of the network appliance 102 (assuming the data packets are not blocked by the tool).

Figure 1B:
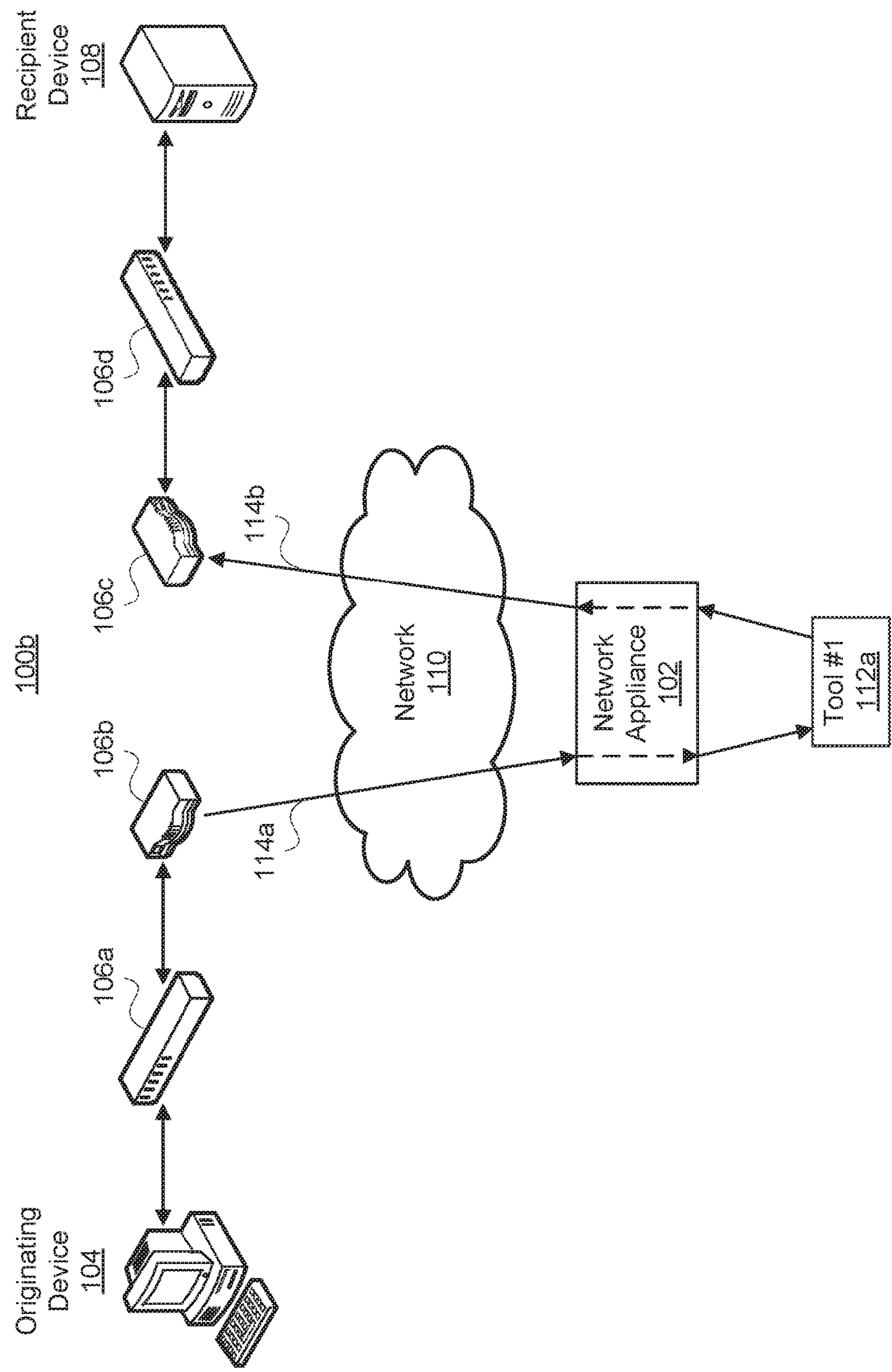
FIG. 1B illustrates an example path of a data packet as the data packet travels from an originating device to a recipient device.

FIG. 1B illustrates an example path of a data packet as the data packet travels from an originating device 104 to a recipient device 108. More specifically, FIG. 1B depicts a network arrangement 100*b* in which the network appliance 102 and a network tool 112*a* are both deployed as inline devices (i.e., within the flow of network traffic). Although the transmission paths connecting the network appliance 102 and network tool 112*a* are half duplex wires (i.e., only transmit information in one direction), full duplex wires capable of transmitting information in both directions could also be used for some or all of the transmission paths between nodes of the computer network.

After receiving a data packet from node 106*b*, the network appliance 102 identifies a flow map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the proper flow map could be identified based on the network port (of the network appliance 102) on which the data packet was received, or the source node from which the data packet was received.

The flow map represents a policy for how the data packet is to be handled by the network appliance 102. For example, the flow map could indicate that the data packet is to be aggregated with another data packet, filtered, modified (e.g., stripped of a header or payload), or forwarded to one or more tool ports. Moreover, the flow map could specify that the data packet is to be transmitted in a one-to-one configuration (i.e., from a network port of the network appliance 102 to a tool port of the network appliance 102) or one-to-many configuration (i.e., from a network port of the network appliance 102 to multiple tool ports of the network appliance 102). Similarly, a single tool port of the network appliance 102 could receive data packets from one or more network ports of the network appliance 102.

Often, the data packet is passed (e.g., by a processor of the network appliance 102) to a tool port for transmission downstream to a network tool (e.g., a monitoring and/or security tool). Here, for example, the flow map may specify that the data packet is to be passed by the network appliance 102 to a tool port for transmission downstream to tool 112*a*. The network appliance may aggregate or modify the data packet in accordance with the policy specified by the flow map before passing the data packet to a tool port for transmission downstream to the network tool 112*a*. In some embodiments, the network appliance 102 includes multiple tool ports, each of which is coupled to a different network tool.

After analyzing the data packet, the tool 112*a* normally transmits the data packet back to the network appliance 102 (i.e., assuming the tool 112*a* does not determine that the packet should be blocked), which passes the data packet to a network port for transmission downstream to another node (e.g., node 106*c*). Because the data packet is transmitted from node 106*b* to node 106*c* through the network appliance 102 and tool 112*a*, it is important to quickly identify instances of congestion that may cause the network appliance 102 or tool 112*a* to become bogged down.

Several possible bottlenecks exist along the example path shown in FIG. 1B. For example, a tool port of the network appliance 102 may become highly congested when the tool port simultaneously or sequentially receives data packets from multiple network ports of the network appliance 102. Similarly, the network tool 112*a* coupled to the tool port may have bandwidth restrictions that limit how many data packets can be received during a given duration of time. Both scenarios represent examples of high congestion, where quality of network service is reduced because the tool port of the network appliance 102 and the network tool 112*a* are attempting to receive more data packets than can be handled. Congestion may result in queueing delay, blocking of new network connections, and indiscriminate dropping of data packets.

Quality of Service for Flow Mapping

Figure 2:
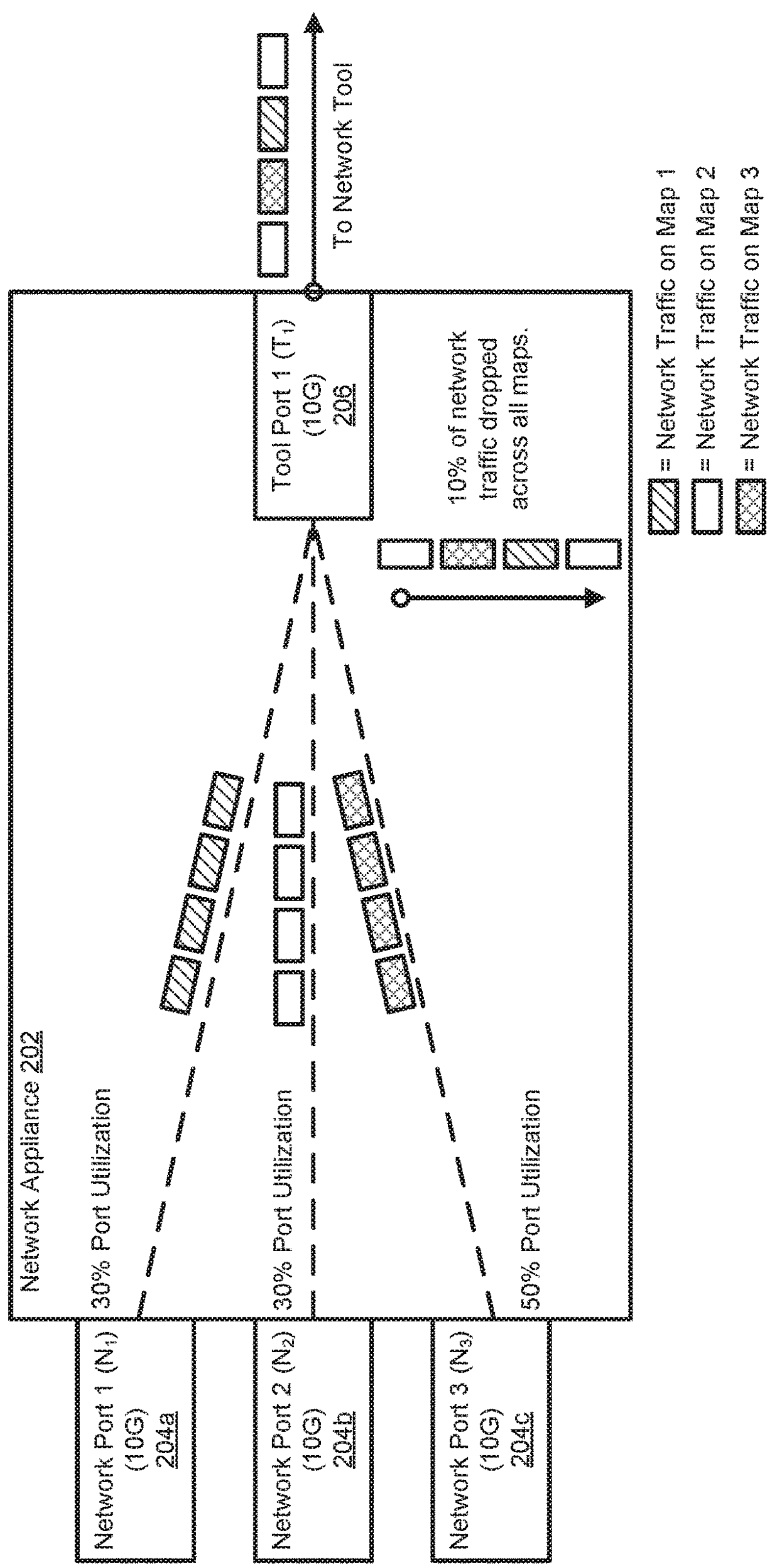
FIG. 2 illustrates how a conventional network appliance indiscriminately drops data packets across multiple flow maps during periods of high congestion.

FIG. 2 illustrates how a conventional network appliance 202 indiscriminately drops data packets across multiple flow maps during periods of high congestion. The network appliance 202 that includes three network ports 204*a-c* that are configured to forward data packets to a tool port 206. Each of the network ports 204*a-c* is associated with a capacity limitation (also referred to as a "throughput limitation" or "bandwidth limitation"). For example, each of the network ports 204*a-c* shown here has an identical capacity limitation of 10 gigabits. Note, however, that each of the network ports 204*a-c* could be associated with a different capacity limitation.

After receiving data packets at the network ports 204*a-c*, the network appliance 202 identifies a flow map for the data packets received at each network port. In some embodiments, the flow maps specify that the data packets received at multiple network ports should be forwarded to a single tool port. Here, for example, a first flow map specifies that the data packets received at Network Port 1 ($N_1$) 204*a* should be forwarded to Tool Port 1 ($T_1$) 206, a second flow map specifies that the data packets received at Network Port 2 ($N_2$) 204*b* should be forwarded to Tool Port 1 ($T_1$) 206, and a third flow map specifies that the data packets received at Network Port 3 ($N_3$) 204*c* should be forwarded to Tool Port 1 ($T_1$) 206.

When traffic flow through the network ports 204*a-c* is low, all of the data packets can be forwarded to Tool Port 1 ($T_1$) 206 without issue. That is, when utilization of the network ports 204*a-c* is collectively less than the capacity limitation of Tool Port 1 ($T_1$) 206 (i.e., $N_1+N_2+N_3$ 100% $T_1$ Capacity), no data packets are dropped by the network appliance 202. However, such a configuration may cause the Tool Port 1 ($T_1$) 206 to become overloaded during periods of high congestion. For example, utilization of the network ports 204*a-c* may exceed the capacity of Tool Port 1 ($T_1$) 206 during periods of high network traffic, which causes some of the data packets corresponding to each flow map to be dropped indiscriminately. Generally, all of the flow maps that cause data packets to be forwarded to the congested tool port will experience dropping of data packets, and the drop is typically consistent across all of the flow maps. But this can cause significant disruptions in the flow of network traffic, particularly when the network appliance 202 and the network tool connected to Tool Port 1 ($T_1$) 206 are deployed as inline devices.

Figure 3A:
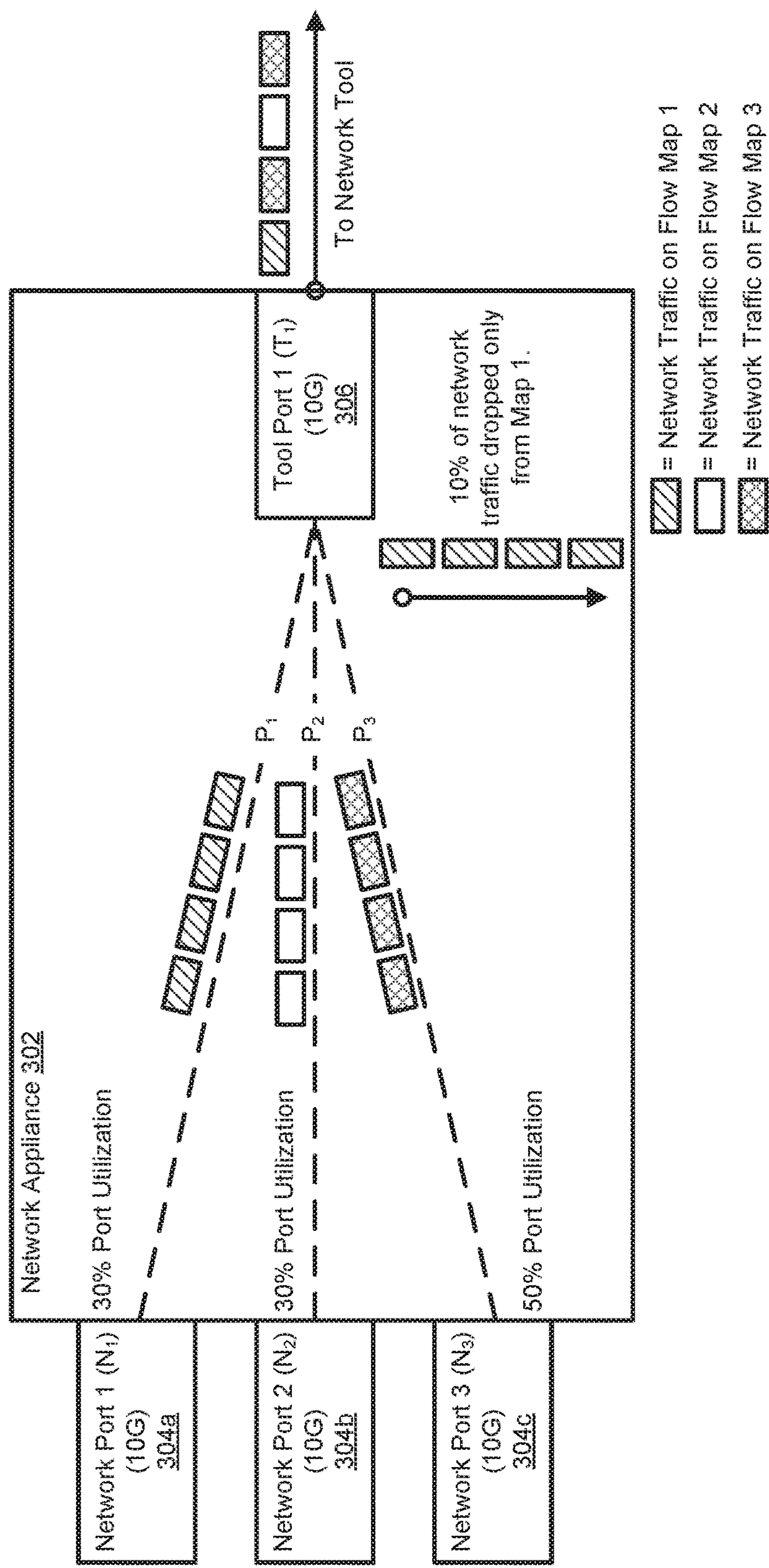
FIG. 3A depicts how the techniques described herein enable a network appliance to selectively drop at least some of the data packets corresponding to certain flow maps.

FIG. 3A depicts how the techniques described herein enable a network appliance 302 to selectively drop at least some of the data packets corresponding to certain flow maps. Similar to FIG. 2, the Tool Port 1 ($T_1$) 306 has become highly congested because utilization of the network ports 304*a-c* has exceeded the capacity limitation of Tool Port 1 ($T_1$) 306 (i.e., $N_1+N_2+N_3>100\%$ $T_1$ Capacity).

Here, however, a priority measure has been assigned to each of the flow maps. $P_1$, $P_2$, and $P_3$ represent the priority measures assigned to each flow map and are listed in ascending order (i.e., $P_3>P_2>P_1$). The priority measures may be manually specified by an administrator of the network appliance 302 or automatically assigned by the network appliance 302 based on a criteria of the data packets corresponding to each flow map. For example, a priority measure may be based on utilization of the corresponding network port(s), the network port(s) on which the network traffic is received, the source node(s) from which the data packets are received, etc. The priority measures can be stored within a memory of the network appliance 302 (e.g., within a database that maps priority measures to flow maps).

Because Flow Map 1 (which corresponds to Network Port 1 ($N_1$) 304*a*) has the lowest priority measure, at least some of the data packets governed by Flow Map 1 are dropped when utilization exceeds the capacity limitation of Tool Port 1 ($T_1$) 306. Thus, the network appliance 302 can selectively drop low priority network traffic during periods of high congestion and continue forwarding high priority network traffic to Tool Port 1 ($T_1$) 306 for transmission downstream to a network tool. Assigning a priority measure to each flow map also enables the network appliance 302 (or an administrator) to control which data packets are dropped in a more deterministic manner, rather than suffer from indiscriminate dropping of data packets across all flow maps as would conventionally occur.

Figure 3B:
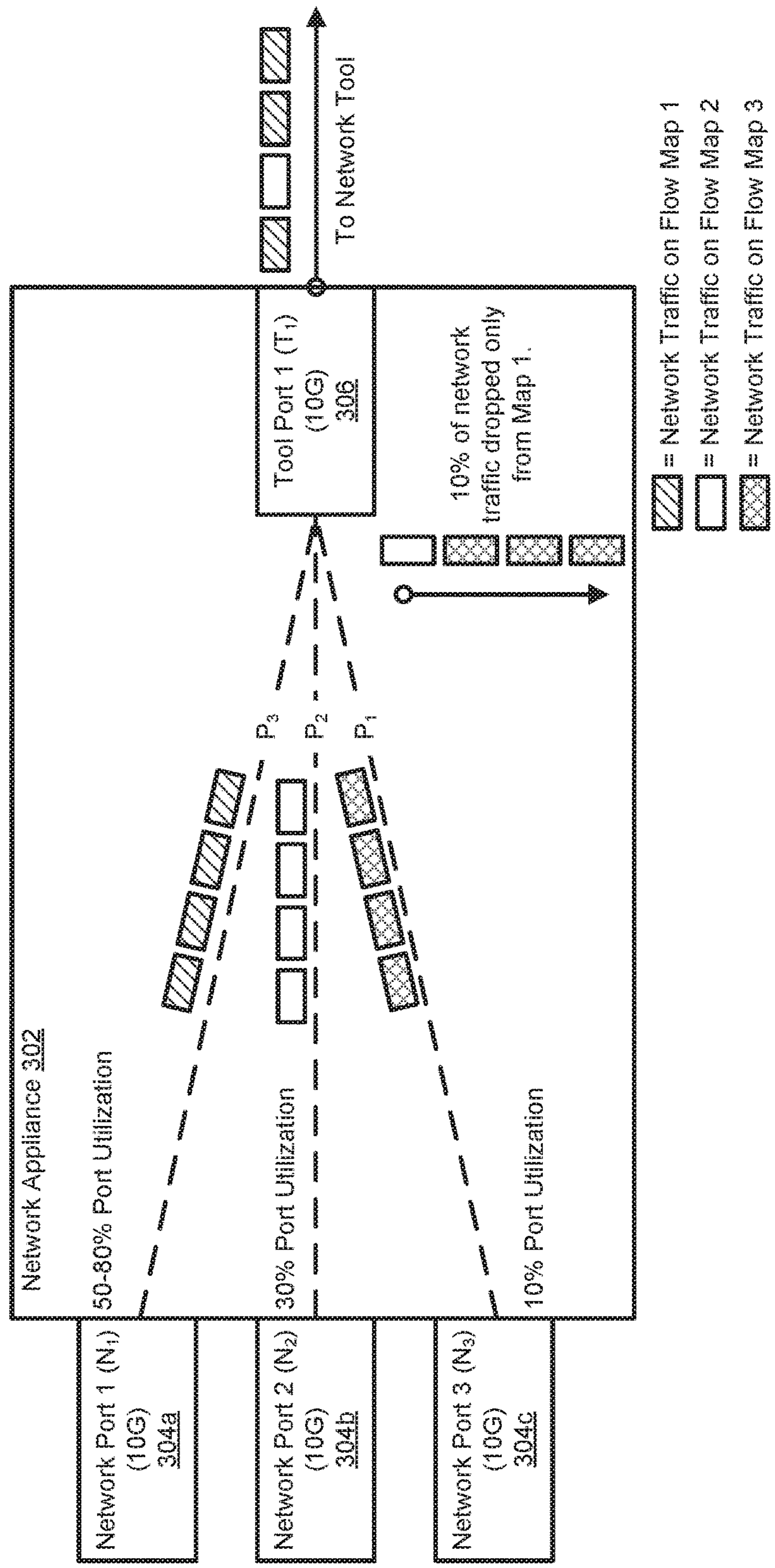
FIG. 3B depicts another scenario in which at least some of the data packets corresponding to some flow maps are dropped, while the data packets corresponding to another flow map continue to be forwarded to a tool port undisturbed.

FIG. 3B depicts another scenario in which at least some of the data packets corresponding to Flow Map 2 and Flow Map 3 are dropped, while the data packets corresponding to Flow Map 1 continue to be forwarded to Tool Port 1 ($T_1$) 306 undisturbed. Again, $P_1$, $P_2$, and $P_3$ represent the priority measures assigned to each flow map and are listed in ascending order (i.e., $P_3>P_2>P_1$); however, the priority order of network ports 304*a-c* has been changed.

The network appliance 302 may drop data packets corresponding to multiple flow maps in several scenarios. For example, the network appliance 302 may drop all data packets corresponding to the flow map having the lowest priority measure (i.e., Flow Map 3) and discover that utilization continues to exceed the capacity limitation of Tool Port 1 ($T_1$) 306. Therefore, the network appliance 302 may begin dropping at least some of the data packets corresponding to the flow map having the next lowest priority measure (i.e., Flow Map 2). The data packets corresponding to the flow map having the highest priority measure (i.e., Flow Map 1) can continue to be forwarded to Tool Port 1 ($T_1$) 306 undisturbed.

Figure 4:
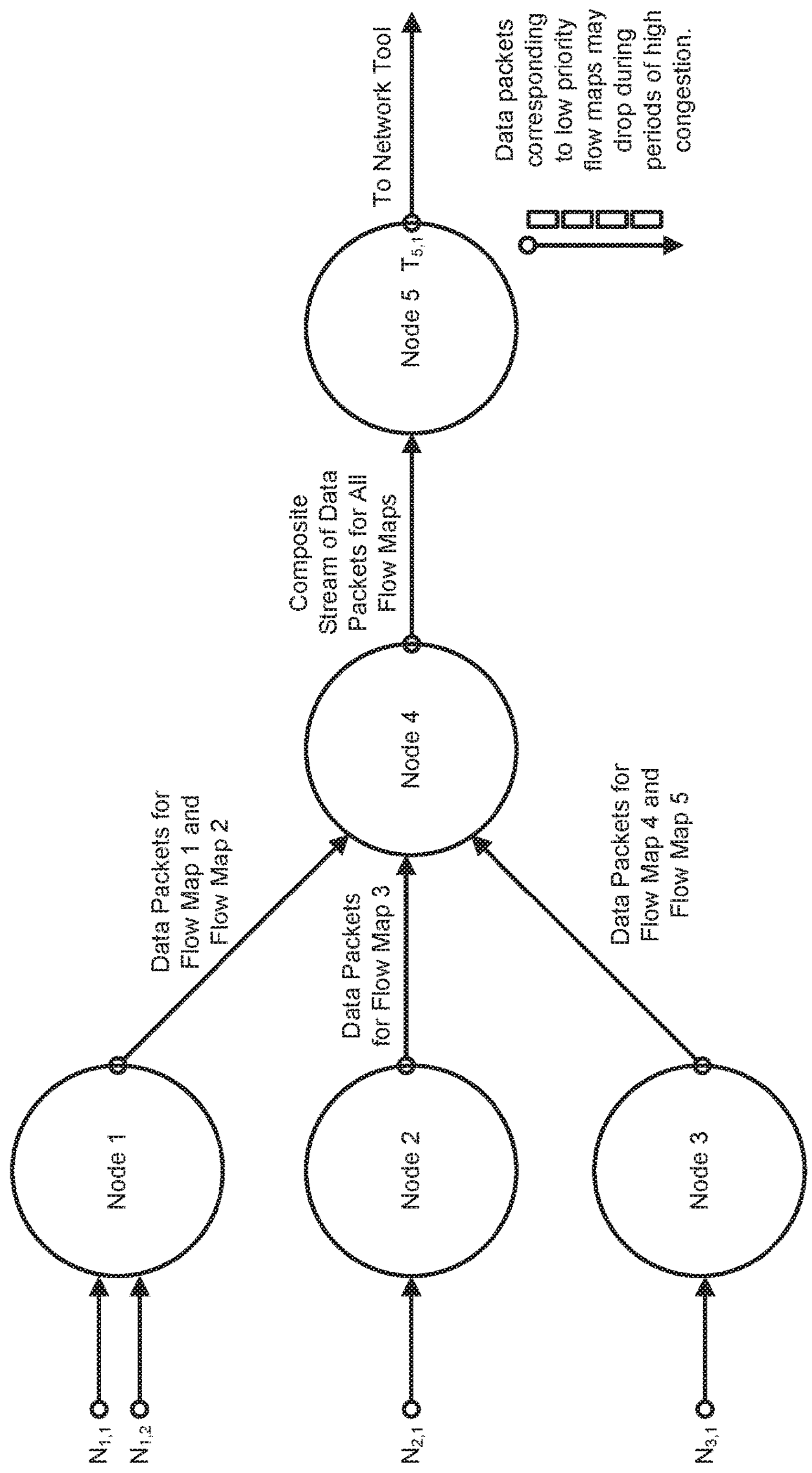
FIG. 4 depicts a cluster of multiple interconnected devices in a visibility fabric of a computer network.

FIG. 4 depicts a cluster of multiple interconnected devices in a visibility fabric of a computer network. Multiple devices (also referred to as "nodes") exist within the visibility fabric that are connected to one another. For example, an administrator may design a network configuration in which the egress ports of an ingress node (e.g., Node 1) are communicatively coupled to the ingress ports of one or more other nodes (e.g., Node 4) by stack links (i.e., physical cables) extending directly between the two ports. Note, however, that such configurations typically require an understanding of how the nodes within the visibility fabric are linked to one another in order to correctly relay incoming data packets to the appropriate node (e.g., for filtering).

The techniques described herein can be used to govern traffic priority as data packets traverse the entire visibility fabric. For example, a priority measure can be assigned to each flow map known to an ingress node (e.g., Node 1, Node 2, or Node 3). Ingress nodes are those nodes that receive incoming data packets from the computer network. After receiving a data packet, the ingress node can tag the data packet with an identifier based on the priority measure of the flow map governing that data packet. The identifier may be carried by the data packet as it traverses the visibility fabric.

More specifically, the identifier is a metadata field that is added to each data packet when it enters the visibility fabric and is stripped from the data packet before it leaves the visibility fabric (e.g., is transmitted to a tool). While any known identification scheme could be used to generate the identifiers, particular identification schemes may be preferable in certain instances. For example, the ingress node(s) may include a table of flow maps that are used within the visibility fabric and create identifiers that are easily comparable by nodes downstream of the ingress node(s). These identifiers may be used by all nodes within the visibility fabric (e.g., ingress nodes and non-ingress nodes) to determine which data packets should be dropped during periods of high congestion.

Here, for example, the visibility fabric includes five nodes that are grouped in a cluster. An administrator has designed the cluster so that data packets corresponding to Flow Map 1 and Flow Map 2 are forwarded downstream by Node 1 to a tool port of Node 5 via Node 4. Similarly, the visibility fabric has been designed so that data packets corresponding to Flow Map 3 (from Node 2), Flow Map 4 (from Node 3), and Flow Map 5 (from Node 3) are also forwarded downstream to the tool port of Node 5 via Node 4. The priority ordering of flow maps, meanwhile, is Flow Map 1, Flow Map 2, Flow Map 3, Flow Map 4, and Flow Map 5 in descending order.

Despite receiving data packets from three separate nodes, Node 4 has sufficient bandwidth to handle the incoming data packets and does not need to drop any data packets. However, when the composite stream of data packets reaches Node 5, the tool port experiences congestion and Node 5 selectively drops some or all of the data packets corresponding to the flow maps having the lowest traffic priority (e.g., Flow Map 4 and Flow Map 5). High priority network traffic continues to be transmitted downstream through the tool port unaffected.

Figure 5:
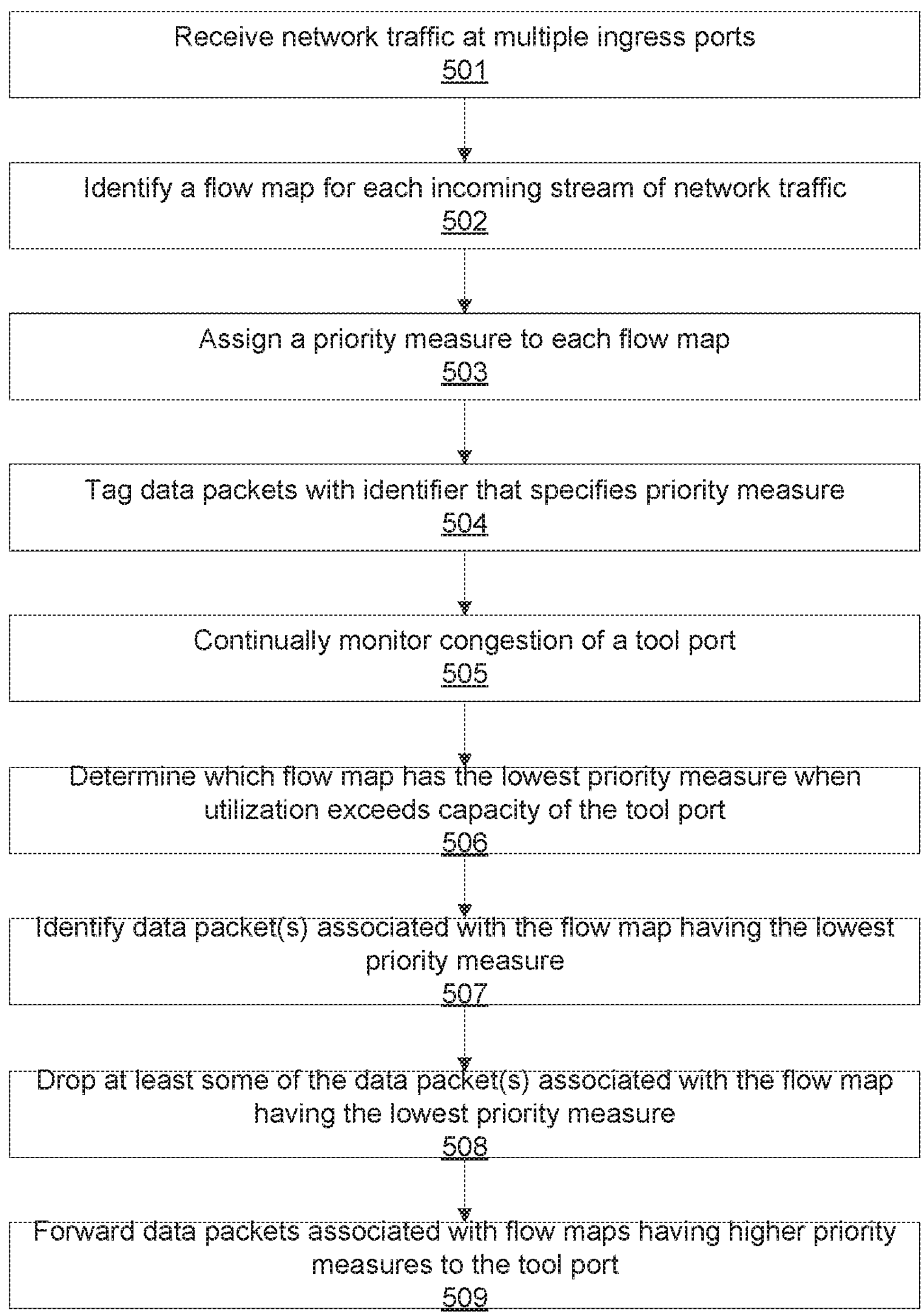
FIG. 5 depicts a process for selectively dropping data packets traversing a visibility fabric of a computer network.

FIG. 5 depicts a process 500 for selectively dropping data packets traversing a visibility fabric of a computer network. Streams of network traffic are initially received by a network appliance at multiple ingress ports (step 501). A flow map is then identified for each stream of network traffic that specifies how the data packets of each stream are to be handled by the network appliance (step 502). The network appliance can identify the proper flow map based on one or more characteristics of the data packets that form a stream of network traffic. For example, the characteristic(s) could include the communication protocol of which the data packet is a part (e.g., HTTP, TCP, IP) or a session feature (e.g., a timestamp). Additionally or alternatively, the proper flow map could be identified based on the ingress port on which the data packet was received, or the source node from which the data packet was received.

When multiple flow maps specify that data packets are to be forwarded to a single egress port (also referred to as a "tool port" when coupled to a network tool) (step 503), steps must be taken to ensure that traffic flow is not disrupted by the indiscriminate dropping of high priority data packets. Accordingly, the network appliance can assign a priority measure to each flow map (step 503). The priority measure assigned to each flow map governs how the network appliance will react during periods of high congestion. More specifically, the priority measures enable greater control over which data packets are dropped during these periods of high congestion. In some embodiments, the network appliance tags the data packets within each stream of network traffic with an identifier that specifies the priority measure (step 504). The identifier is a metadata field that is added to each data packet when it enters the network appliance and may be stripped from the data packet before it leaves the network appliance (e.g., is transmitted to a tool).

The network appliance can then continually monitor congestion of the tool port (step 505). More specifically, the network appliance can continually compare utilization of one or more network ports at which data packets are received to the capacity limitation of the tool port. When utilization does not exceed the capacity limitation, all of the data packets received by the network appliance at the network port(s) can be forwarded to the tool port. However, responsive to determining that the utilization of the network port(s) exceeds the capacity limitation of the tool port, the network appliance can determine which of the flow maps has the lowest priority measure (step 506). The network appliance can identify those data packets that are associated with the flow map having the lowest priority measure (step 507). For example, the network appliance may parse individual data packets to identify the identifiers with which the data packets were previously tagged.

The network appliance can then drop at least some of the data packets associated with the flow map having the lowest priority measure (step 508), while data packets associated with those flow maps having higher priority measures are forwarded to the tool port undisturbed (step 509).

Metered Flow Mapping

Metering (also known as "policing") is the process of monitoring network traffic for compliance with a traffic contract and, in some instances, taking steps to enforce the traffic contract. Traffic sources (e.g., nodes in a computer network) that are aware of a traffic contract may perform certain techniques to shape incoming network traffic to ensure output stays within the traffic contract (and thus is not discarded). Network traffic that exceeds the traffic contract (also referred to as "excess network traffic") may be discarded immediately, marked as non-compliant, or left as-is depending on the administrative policy of the network appliance or the characteristics of the excess network traffic.

By metering the network traffic handled by a network appliance, the network appliance can better control how network traffic is forwarded to tool ports, thereby saving the network tools coupled to the tool ports from being overwhelmed. These techniques also enable the network appliance to intelligently cascade network traffic across multiple network tools during periods of high traffic volume. For example, the network appliance may shift data packets from a first network tool to a second network tool when the first network tool is running at or near full capacity.

One or more flow meters can be used by the network appliance to ensure that the network traffic output by the network appliance (e.g., to one or more tool ports) conforms to a specified bandwidth profile. Often, the flow meter(s) are implemented on a per-flow map basis. For example, as long as the network traffic to be output by the network appliance is within the specified bandwidth profile, the network traffic continues to be forwarded to the tool port(s). However, when the network traffic crosses the specified bandwidth profile, excess network traffic undergoes specific treatment. For example, excess data packets could be forwarded to another tool port for transmission downstream to a different network tool or dropped entirely.

Figure 6:
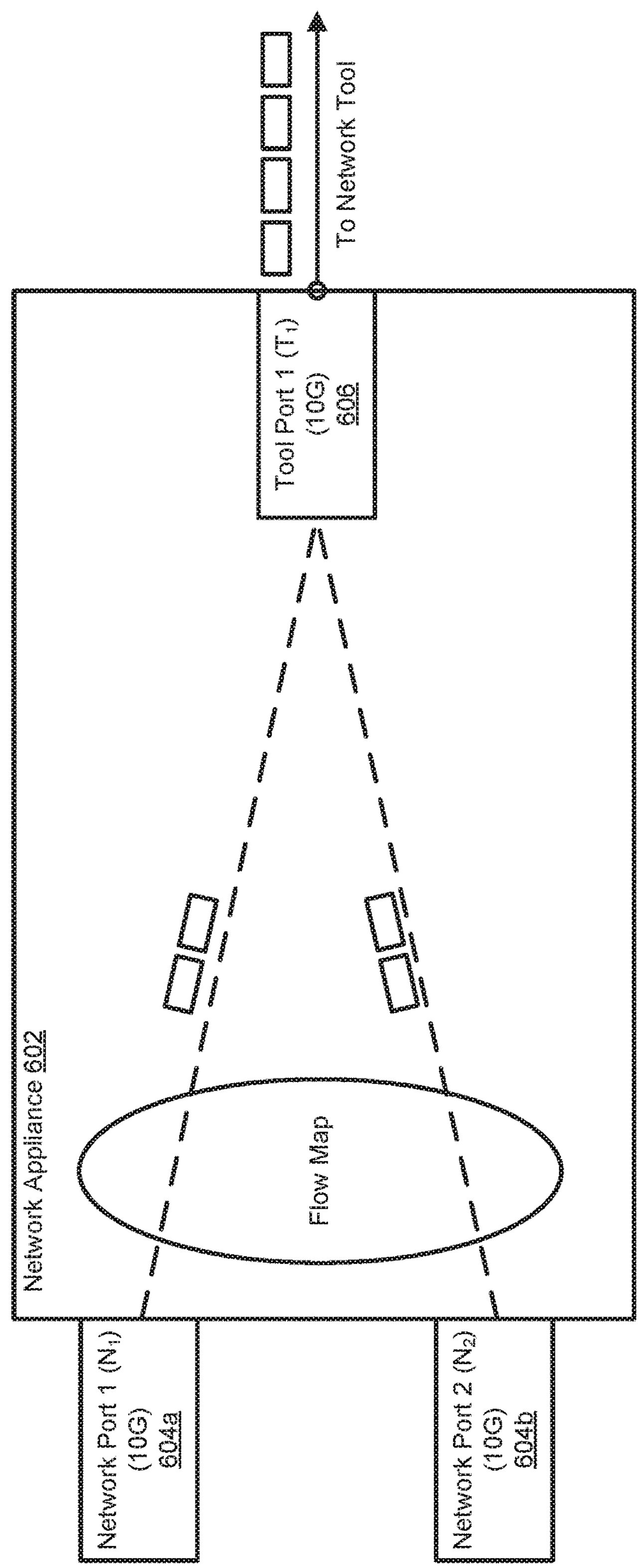
FIG. 6 depicts a network appliance that includes multiple network ports for receiving network traffic and a tool port for forwarding at least some of the network traffic downstream to a network tool.

FIG. 6 depicts a network appliance 602 that includes multiple network ports 604*a-b* for receiving network traffic and a tool port 606 for forwarding at least some of the network traffic downstream to a network tool. When network traffic is received by the network appliance 602 at the network ports 604*a-b*, the network appliance 602 identifies the flow map(s) that will govern how the network traffic is to be handled by the network appliance 602. For example, a flow map could specify that network traffic received at Network Port 1 ($N_1$) 604*a* and Network Port 2 ($N_2$) 604*b* should be forwarded to Tool Port 1 ($T_1$) 606. The composite stream of network traffic can be forwarded downstream to a network tool (e.g., a network analysis or security tool) by a stack link connected to Tool Port 1 ($T_1$) 606.

While network tools are traditionally sophisticated, they are also resource intensive and, consequently, may have limited data packet processing capacity. This issue has grown in magnitude as network providers and administrators desire to monitor more network traffic than ever before. During periods of high traffic volume, network tools may become overwhelmed and network appliances may attempt to filter out unwanted or uninteresting data packets (and then present the network tools with the interesting filtered data packets). But even the filtered data packets can be overwhelming at times and threaten the functionality and usefulness of the network tools. Moreover, the unwanted or uninteresting data packets can, and often do, include valuable information that may be useful in improving and/or securing a computer network.

Figure 7A:
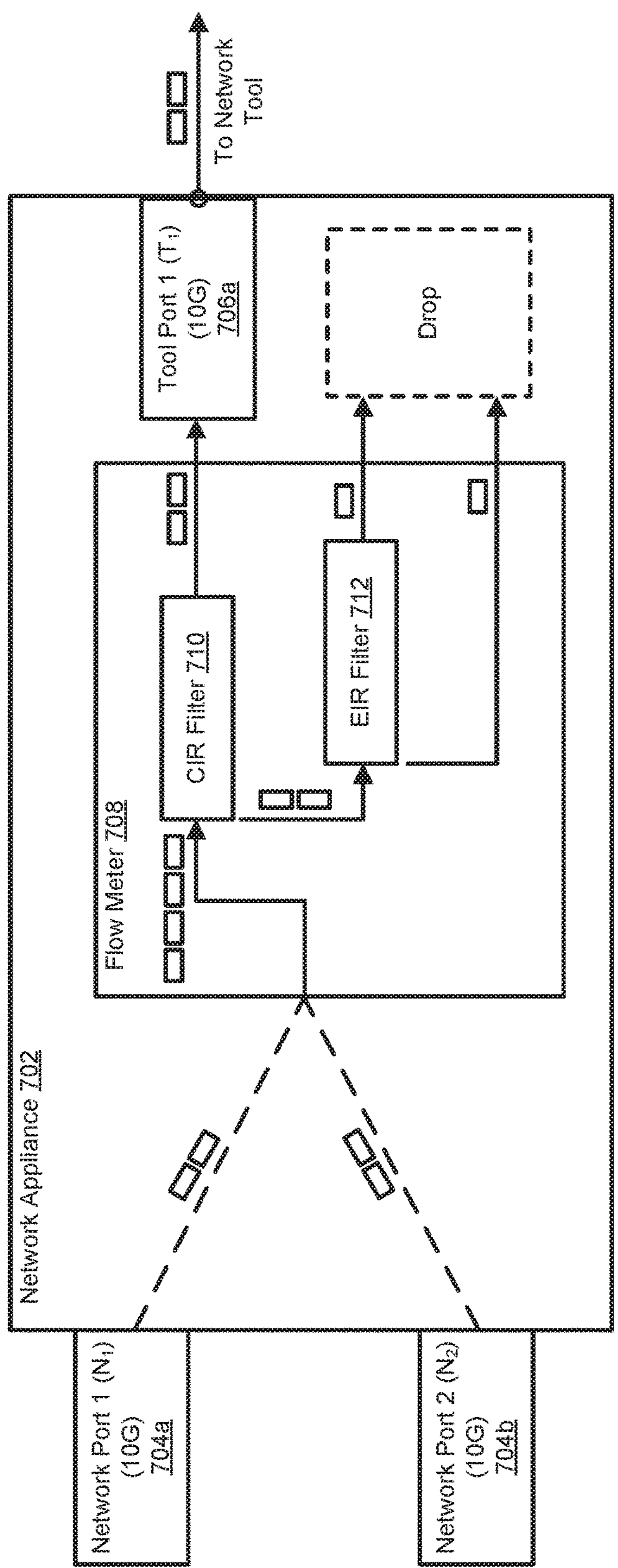
FIG. 7A illustrates how one or more flow meters can be used to meter the number of data packets that are forwarded to each tool port of a network appliance.
Figure 7B:
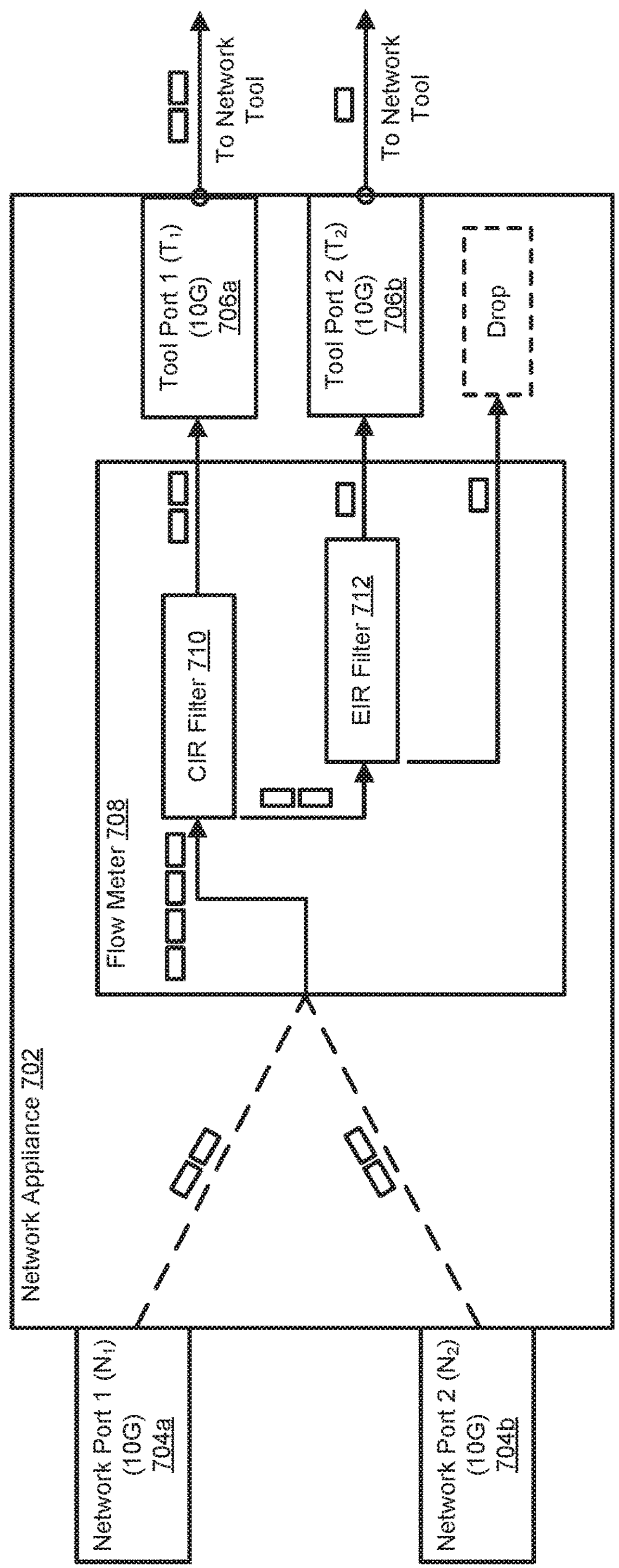
FIG. 7B depicts a second scenario in which a flow meter is used to meter the number of data packets being forwarded to the tool ports of a network appliance.
Figure 7C:
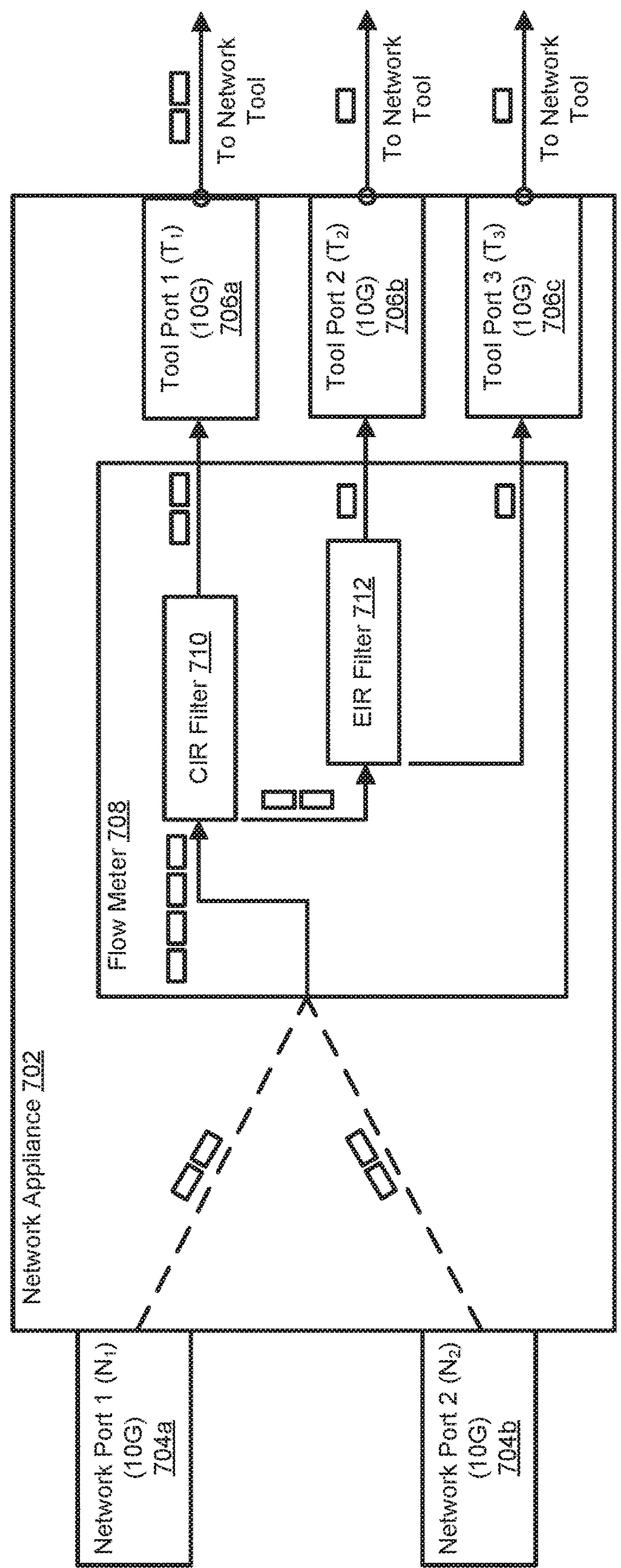
FIG. 7C depicts a third scenario in which a flow meter is used to meter the number of data packets being forwarded to the tool ports of a network appliance.

FIGS. 7A-C illustrate how one or more flow meters can be used to meter the number of data packets that are forwarded to each tool port of a network appliance 702. Flow meters enable an administrator to set a specified bandwidth profile for a network tool that prevents the network tool from receiving more network traffic than it can handle and becoming bogged down. Flow meters can also be used by the network appliance 702 to cascade network traffic across multiple network tools, including high capacity tools and low capacity tools (which may serve as backups). Cascading network traffic across multiple network tools may serve as a measure of cost optimization so that low-cost network tools receive the network traffic when traffic volume of the computer network is low, and more costly network tools can begin to share the load when the traffic volume of the computer network is high.

As shown in FIGS. 7A-C, the network appliance 702 can include a flow meter 708 (also referred to as a "flow policer") that controls the number of data packets that are forwarded to Tool Port 1 ($T_1$) 706*a*. The network appliance 702 may implement the flow meter 708 on a per-flow map basis. Consequently, a single network appliance may include multiple flow meters. The flow meter 708 could include, for example, one or more standard "Two Rate Three Color Marker" (trTCM) meters.

The flow meter 708 is programmed with one or more threshold rates that are used to determine the appropriate action to be taken for incoming data packets. For example, the flow meter 708 may include a committed information rate (CIR) filter 710 programmed with a lower threshold rate, an excess information rate (EIR) filter 712 programmed with an upper threshold rate, or both. The upper and lower threshold rates are generally defined in terms of kilobits per second (kb/s) or data packets per second (packet/sec). One or both of these rates can be manually specified by an administrator of the network appliance 702 or automatically determined by the network appliance 702. For example, the network appliance 702 may automatically set the upper threshold rate based on a maximum bandwidth of Tool Port 1 ($T_1$) 706*a* or the stack link that connects Tool Port 1 ($T_1$) to a network tool. Once the CIR filter 710 has been programmed with the lower threshold rate, the tool port 706*a* will not see network traffic that exceeds the lower threshold rate (and thus can proactively protect Tool Port ($T_1$) 706*a* from being overwhelmed).

As shown in FIG. 7A, network traffic received by the network appliance 702 is passed through the CIR filter 710. Network traffic that falls below the lower threshold rate continues to be forwarded to Tool Port 1($T_1$) 706*a*, while excess network traffic that exceeds the lower threshold rate may be dropped.

However, other operations could also be performed. For example, the network appliance 702 may pass the excess network traffic through the EIR filter 712 for another round of filtering. Network traffic that falls below the upper threshold rate could be forwarded to Tool Port 2 ($T_2$) 706_b_ (see FIGS. 7B-C), while network traffic that exceeds the upper threshold rate could be forwarded to Tool Port 3 ($T_3$) 706_c_ (see FIG. 7C) or dropped (see FIG. 7B).

Thus, the flow meter 708 enables the network appliance 702 to filter network traffic before being forwarded downstream and, in some instances, intelligently cascade the network traffic across multiple network tools. In fact, an administrator may configure the network appliance 702 to make use of multiple network tools based on the traffic volume at a given time. For example, high-capacity network tools and low-cost network tools may be preferably during periods of low traffic volume, while those network tools that are outdated or incur a higher cost may be used during periods of high traffic volume.

FIGS. 7A-C also illustrate how the network traffic governed by a given flow map can be broken down into three different traffic levels: (1) network traffic that falls below the lower threshold rate; (2) network traffic that exceeds the lower threshold rate but falls below the upper threshold rate; and (3) network traffic that exceeds the upper threshold rate. The network appliance 702 may act based on which traffic level(s) are in use at a given point in time.

Figure 8:
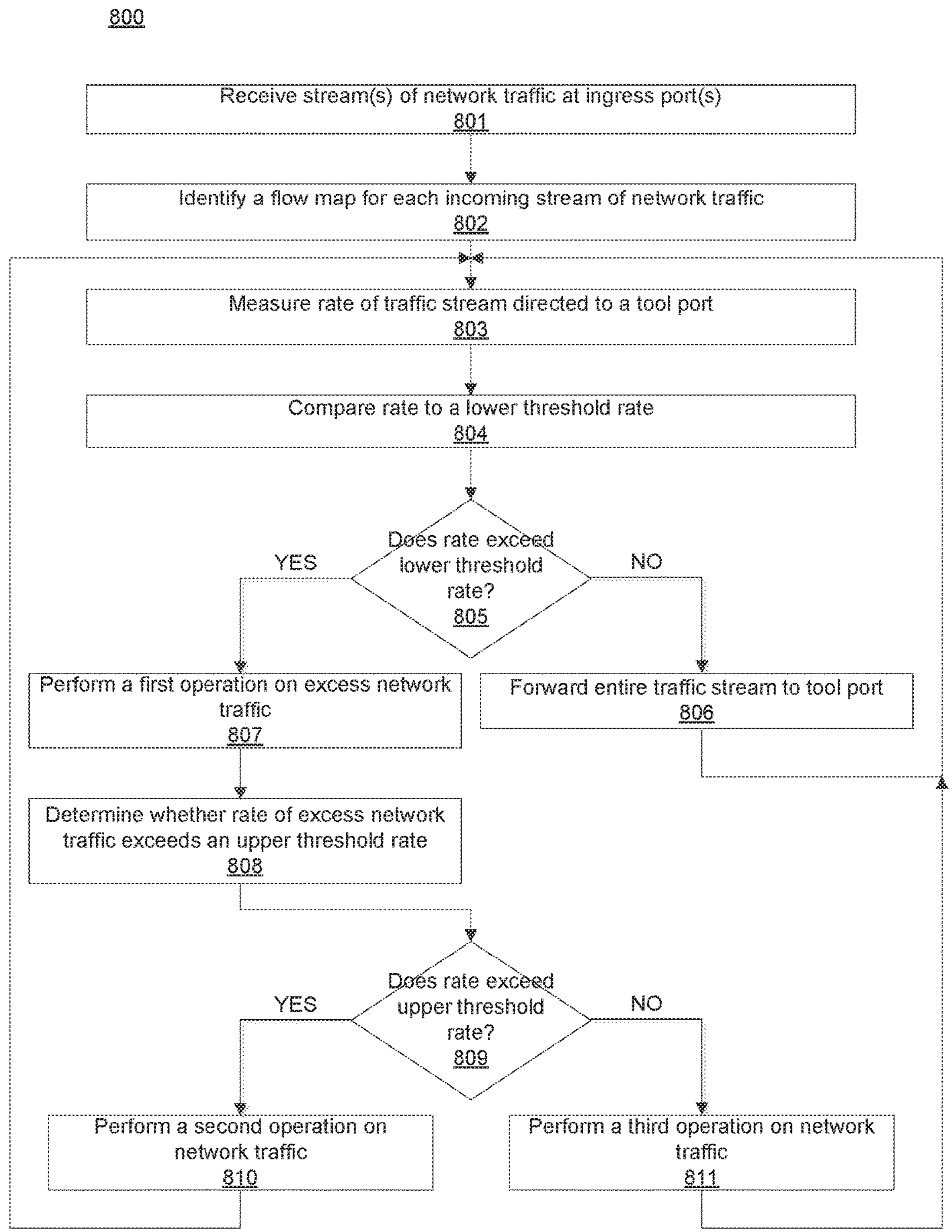
FIG. 8 depicts a process for intelligently metering the network traffic forwarded to a tool port of a network appliance.

FIG. 8 depicts a process 800 for intelligently metering the network traffic forwarded to a tool port of a network appliance. One or more streams of network traffic are initially received by a network appliance at one or more ingress ports (step 801). For example, a single stream of network traffic may be at a single network port or multiple streams of network traffic may be simultaneously or sequentially received at multiple network ports. A flow map is then identified for each incoming stream of network traffic (step 802). More specifically, the network appliance can identify a flow map based on one or more characteristics of the data packet(s) that make up the stream of network traffic. For example, the characteristic(s) could include the communication protocol of which the network traffic is a part (e.g., HTTP, TCP, IP) or a session feature (e.g., a timestamp). The flow map governs how the data packet(s) are to be handled by the network appliance and specifies the tool port(s) to which at least some of the data packet(s) should be routed. In some embodiments, the network traffic received at multiple network ports is forwarded as a composite traffic stream to a single tool port.

A flow meter measures the traffic rate of the traffic stream directed to the tool port (step 803) and compare the traffic rate to a lower threshold rate that is programmed into the flow meter (step 804). For example, the flow meter could compare the measured traffic rate to the lower threshold rate by passing the traffic stream through a CIR filter.

The flow meter can then determine whether the measured traffic rate exceeds the lower threshold rate (step 805). When the measured traffic rate falls below the lower threshold rate, the traffic stream can be forwarded to the tool port in its entirety (step 806). However, when the measured traffic rate exceeds the lower threshold rate, an operation can be performed on the excess network traffic (step 807). For example, some or all of the excess network traffic could be dropped (as shown in FIG. 7A) or forwarded to another tool port for transmission downstream to another network tool (as shown in FIGS. 7B-C).

In some embodiments, the excess network traffic is also compared to an upper threshold rate that is programmed into the flow meter (step 808). The flow meter could filter the excess network traffic a second time by passing the excess network traffic through an EIR filter. The flow meter can then determine whether the traffic rate of the excess network traffic exceeds the upper threshold rate (step 809). The flow meter can perform a second operation (step 810) when the excess network traffic exceeds the upper threshold rate, and the flow meter can perform a third operation (step 811) when the excess network traffic falls below the upper threshold rate. The second and third operations can similar or different. For example, the flow meter could cascade the excess network traffic across multiple tool ports in order to achieve greater bandwidth. In such scenarios, the second operation may require the flow meter forward some of the excess network traffic to a second tool port and some of the excess network traffic to a third tool port. Alternatively, some or all of the excess network traffic could be dropped entirely.

An administrator may be able to set the upper and lower threshold rates and/or specify how excess network traffic should be handled via a management interface. For example, the administrator may specify that some excess network traffic should be directed to a tool port, while other excess network traffic should be dropped entirely.

Processing System

Figure 9:
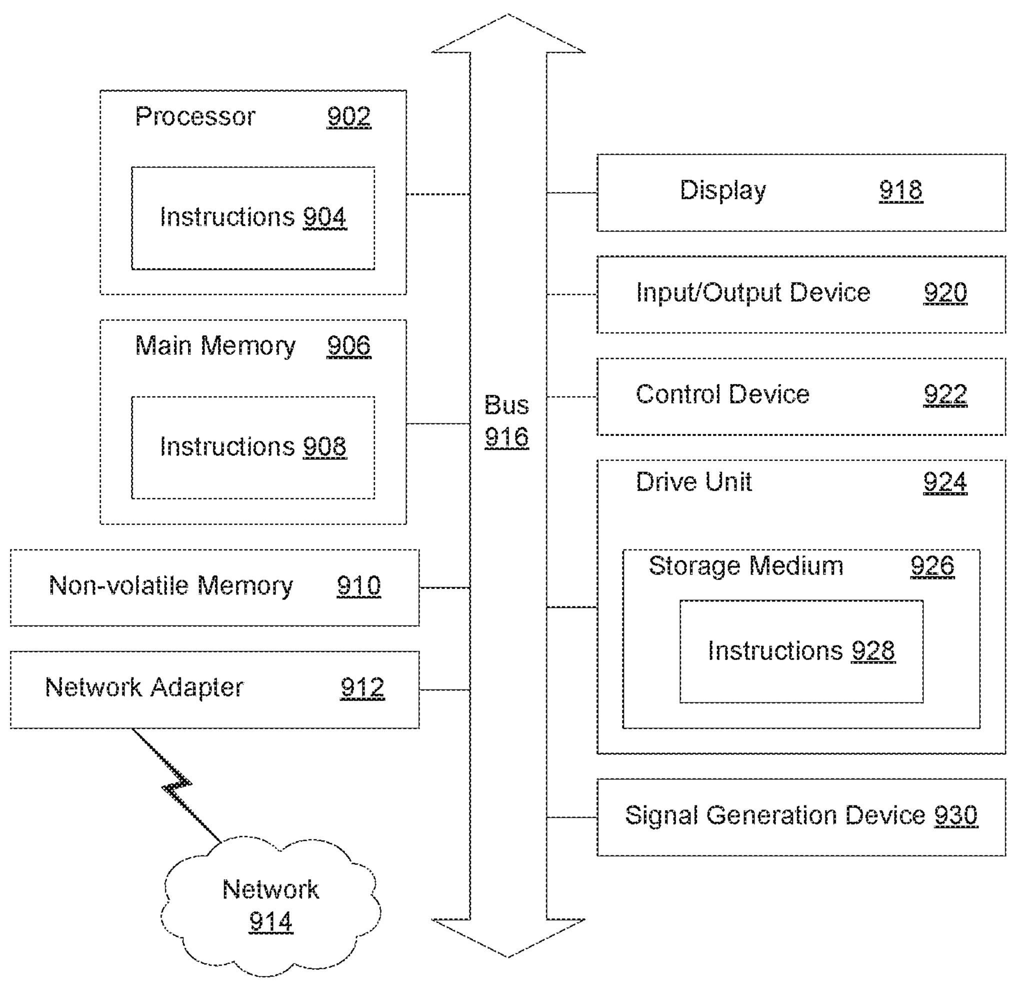
FIG. 9 is a high-level block diagram illustrating an example of a processing system in which at least some operations described herein can be implemented.

FIG. 9 is a block diagram illustrating an example of a processing system 900 in which at least some operations described herein can be implemented. For example, the processing system 900 may be responsible for generating an interface through which an administrator manually associates one or more network ports with a flow map or specifies the lower threshold rate and upper threshold rate. As another example, at least a portion of the processing system 900 may be included in a network appliance (in that case, the processing system 900 may not include a display 918, but could instead include a switching fabric and one or more network ports). The computing system may include one or more central processing units ("processors") 902, main memory 906, non-volatile memory 910, network adapter 912 (e.g., network interfaces), display 918, input/output devices 920, control device 922 (e.g., keyboard and pointing devices), drive unit 924 including a storage medium 926, and signal generation device 930 that are communicatively connected to a bus 916. The bus 916 is illustrated as an abstraction that represents any one or more separate physical buses, point to point connections, or both connected by appropriate bridges, adapters, or controllers. The bus 916, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 900 operates as a standalone device, although the processing system 900 may be connected (e.g., wired or wirelessly) to other machines. For example, the processing system 900 may include a terminal that is coupled directly to a network appliance. As another example, the computing system 900 may be wirelessly coupled to the network appliance.

In various embodiments, the processing system 900 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 906, non-volatile memory 910, and storage medium 926 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 928. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 904, 908, 928) set at various times in various memory and storage devices in a computer, and that, when read and executed by one or more processing units or processors 902, cause the processing system 900 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 910, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 912 enables the processing system 900 to mediate data in a network 914 with an entity that is external to the processing system 900, such as a network appliance, through any known and/or convenient communications protocol supported by the processing system 900 and the external entity. The network adapter 912 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 912 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for selectively dropping data packets received by a visibility fabric of a computer network, the method comprising:

receiving a first data packet at a first ingress port of a network appliance of the visibility fabric and a second data packet at a second ingress port of the network appliance;

identifying a first flow map for the first data packet and a second flow map for the second data packet;

identifying a first traffic priority of the first flow map and a second traffic priority of the second flow map;

continually monitoring congestion of a first egress port of the network appliance;

based on a determination that the congestion of the first egress port exceeds a first threshold, determining that the first flow map has a lower priority than the second flow map;

forwarding the second data packet corresponding to the second flow map to the first egress port for transmission downstream to a first network tool;

continually monitoring congestion of a second egress port of the network appliance; and based on a determination that the congestion of the second egress port does not exceed a second threshold, forwarding the first data packet corresponding to the first flow map to the second egress port for transmission downstream to a second network tool.

2. The method of claim 1, wherein the first and second flow maps represent policies for how the first and second data packets are to be handled by the network appliance.

3. The method of claim 2, wherein each of the first and second flow maps includes one or more rules representing a detailed traffic distribution policy for the first and second data packets.

4. The method of claim 1, wherein the network appliance is configured to forward the second data packet along a data path from an originating node to a destination node on the computer network, and wherein the network appliance and the first network tool reside along the data path between the originating node and the destination node.

5. The method of claim 1, further comprising:

generating a notification that specifies the first data packet was routed to the second network tool by the network appliance; and causing the notification to be presented on a management interface that is accessible by an administrator.

6. A method comprising:

assigning, by a network appliance, a priority measure to each of a plurality of flow maps maintained by the network appliance that includes a network port and a plurality of tool ports;

when a utilization of the network port of the network appliance exceeds a capacity limitation of a first tool port of the plurality of tool ports, using, by the network appliance, the priority measure to identify a first subset of data packets corresponding to a first flow map of the plurality of flow maps, and a second subset of data packets corresponding to a second flow map of the plurality of flow maps;

forwarding, by the network appliance, the first subset of data packets to the first tool port for transmission downstream to a first network tool; and forwarding, by the network appliance, the second subset of data packets to a second tool port for transmission downstream to a second network tool.

7. The method of claim 6, wherein using the priority measure to identify the first and second subsets of data packets comprises:

accessing, by the network appliance, a database that maps the priority measures to the plurality of flow maps, where the database is maintained in a memory of the network appliance; and comparing, by the network appliance, a first priority measure of the first flow map to a second priority measure of the second flow map; and determining, by the network appliance, that the first flow map has a lower priority than the second flow map based on said comparing.

8. The method of claim 7, further comprising:

including, by the network appliance, a first metadata identifier in a first data packet associated with the first flow map based on the first priority measure associated with the first flow map; and including, by the network appliance, a second metadata identifier in a second data packet associated with the second flow map based on the second priority measure associated with the second flow map.

9. The method of claim 8, further comprising:

stripping, by the network appliance, the second metadata identifier from the second data packet; and forwarding, by the network appliance, the second data packet to the second tool port for transmission downstream to the second network tool.

10. The method of claim 9, wherein the second network tool is external to a visibility fabric of a computer network.

11. The method of claim 8, wherein the network appliance is one of multiple network appliances within a visibility fabric of a computer network.

12. The method of claim 11, where the second metadata identifier represents a value that is associated with the second data packet while the second data packet traverses the visibility fabric.

13. The method of claim 6, further comprising:

parsing, by the network appliance, a stream of data packets received at the network port to identify a metadata identifier included in each data packet, where each metadata identifier is indicative of the priority measure assigned to the corresponding data packet; and identifying, by the network appliance, one or more data packets to be dropped by the network appliance using the metadata identifiers.

14. The method of claim 6, wherein the capacity limitation of the first tool port represents substantially all bandwidth available to the first tool port.

15. The method of claim 6, wherein the priority measure is one of a plurality of priority measures.

16. A network appliance comprising:

a network port at which to receive data packets transmitted over a network to which the network appliance is connected;

a tool port through which to forward at least some of the data packets to a network tool that is external to the network appliance;

a switching fabric configured to identify a flow map for each of the data packets received at the network port; and a flow meter configured to compare a first traffic rate of the data packets to a lower threshold rate programmed in the flow meter, in response to a determination that the first traffic rate does not exceed the lower threshold rate, forward all of the data packets to the tool port for transmission downstream to the network tool, in response to a determination that the first traffic rate exceeds the lower threshold rate, forward a first subset of data packets to the tool port for transmission downstream to the network tool, and perform an operation on a second subset of data packets, compare a second traffic rate of the second subset of data packets to an upper threshold rate programmed in the flow meter, and in response to a determination that the second traffic rate exceeds the upper threshold rate, forward some of the second subset of data packets to a second tool port for transmission downstream to a second network tool.

17. The network appliance of claim 16, wherein the second subset of data packets are forwarded to the second tool port based on user input provided by an administrator at a management interface.

18. The network appliance of claim 16, wherein the operation performed on the second subset of data packets is manually specified by an administrator.

19. The network appliance of claim 16, wherein the lower threshold rate is set automatically and is based at least in part on bandwidth available to the network tool.

20. The network appliance of claim 16, wherein the lower threshold rate is manually specified by an administrator.

21. The network appliance of claim 16, wherein the flow meter is further configured to:

in response to the determination that the second traffic rate exceeds the upper threshold rate, drop some of the second subset of data packets.

22. The network appliance of claim 16, wherein the flow meter is further configured to:

in response to the determination that the second traffic rate exceeds the upper threshold rate, forward some of the second subset of data packets to a third tool port for transmission downstream to a third network tool.

* * * * *